United States Patent [19]
Yoshida

[11] 3,753,566
[45] Aug. 21, 1973

[54] CASSETTE ADAPTER

[75] Inventor: Ichiro Yoshida, Kanagawa-ken, Chigasaka-City, Japan

[73] Assignee: Maruko Co., Ltd., Okaya-City, Japan

[22] Filed: July 6, 1971

[21] Appl. No.: 159,638

[30] Foreign Application Priority Data

Sept. 12, 1970 Japan ............ 45/79662
Jan. 26, 1971 Japan ............ 46/2215

[52] U.S. Cl. ........ 274/4 G, 179/100.2 Z, 226/176
[51] Int. Cl. ........ G11b 15/18
[58] Field of Search ........ 274/4 B, 4 C, 4 E, 274/4 G; 179/100.2 Z; 242/199–200; 226/176, 177

[56] References Cited

UNITED STATES PATENTS

| | | | |
|---|---|---|---|
| 3,531,127 | 9/1970 | Harper | 274/4 G |
| 3,644,684 | 2/1972 | Tsuji | 274/4 G |
| 3,661,395 | 5/1972 | Barr | 274/4 D |
| 3,589,583 | 6/1971 | Tout | 226/176 |
| 3,038,678 | 6/1962 | Papst | 226/180 |
| 3,662,123 | 5/1972 | Huber | 274/4 G |

*Primary Examiner*—Louis R. Prince
*Assistant Examiner*—Dennis A. Dearing
*Attorney*—Eric H. Waters et al.

[57] ABSTRACT

A cassette adapter comprises a casing for receiving a tape cassette, a driving pinch roller which is rotated by a rotational force transmitted thereto from a capstan provided on a tape driving apparatus, and a driven capstan shaft which enters a loaded tape cassette and is positioned inside of the tape. The driving pinch roller is pressed against the driven capstan shaft through the tape and causes the capstan shaft to drive and rotate thereby advancing the tape. When the tape has stopped running, the driving pinch roller is displaced due to increase of friction between the driving pinch roller and the tape and moves away from the capstan shaft.

6 Claims, 5 Drawing Figures

CASSETTE ADAPTER

This invention relates to a cassette adapter and, more particularly, to a cassette adapter for accommodating a tape cassette therein and operating the tape cassette in a tape driving apparatus designed for a tape cartridge.

There have been used tape cartridges such as the Lear jet type one and a tape driving apparatus for this tape cartridge (hereinafter, a tape recording and reproducing apparatus called a tape recorder and a tape reproducing apparatus used exclusively for reproduction called a tape player are generally referred to as a tape driving apparatus.) This tape driving apparatus used for a tape cartridge has a capstan rotated by a motor. The tape cartridge has a pinch roller contained therein which is pressed against the capstan when the cartridge is loaded in the tape driving apparatus.

On the other hand, there have been used Philips type tape cassettes called a "compact cassette" and a tape driving apparatus designed for the tape cassette. This tape driving apparatus used for the tape cassette has a projecting capstan shaft and a pinch roller spaced therefrom. When the tape cassette is loaded from above the capstan shaft, the capstan shaft is received in the tape cassette and is positioned inside the tape. Then, the pinch roller is pressed against the capstan shaft through the tape, whereby the tape is driven.

Accordingly, a tape cartridge and a tape cassette are different in shape and construction from each other. Therefore, it is not possible to load, for example, a tape cassette in a tape driving apparatus for a tape cartridge and operate it therewith.

It is then necessary to provide an apparatus for playing a tape cassette in a tape driving apparatus originally designed for a tape cartridge. It is, therefore, an object of this invention to provide a cassette adapter which is capable of accommodating a tape cassette therein for playing the same with a tape driving apparatus originally designed for a tape cartridge.

As a means for detecting the completion of running in one direction of a tape contined in a tape cassette, there have been used various means such as a means for detecting change of tape tension and thereby operating a switch, a means for detecting electrically a sensing tape attached to the end portion of a tape, and a means for detecting change of electric current flowing through the motor. These detecting means, however, use electrical devices and, accordingly, they tend to have a complicated construction and cause an erroneous operation which makes the operation of these means inaccurate. As means for stopping a tape recorder utilizing the detected output from the aforementioned detecting means, there has been means using a plunger etc. This conventional means is disadvantageous in that it has a very complicated construction with the result that its manufacturing cost is high.

It is, therefore, a further object of the invention to provide a new and useful cassette adapter which is capable of accommodating a cassette and operating the same in a tape driving apparatus designed for a cartridge.

Another object of the invention is to provide a cassette adapter in which a mechanism for transmitting a driving force to the cassette tape has a relatively simple construction and the thickness of the adapter is generally made thin.

A further object of the invention is to provide a cassette adapter in which a tape driving pinch roller and a magnetic head are automatically spaced away from the tape upon completion of running of the tape, whereby the cassette is automatically changed to a stop mode.

Other objects and features of the invention will become apparent from the description given hereinbelow with reference to the attached drawings, in which.

Figure 1:
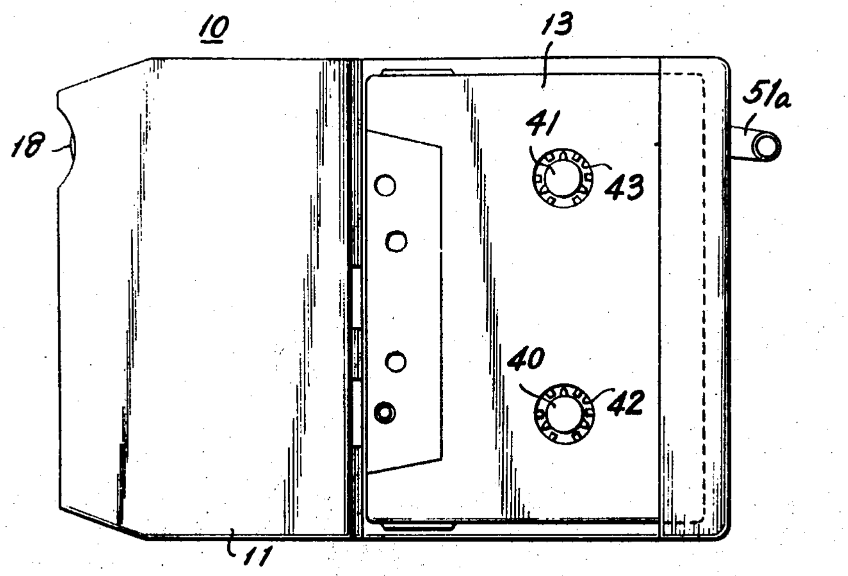
FIG. 1 is a plan view of an embodiment of a cassette adapter according to the present invention showing the state in which a tape cassette is received in the adapter.
Figure 5:
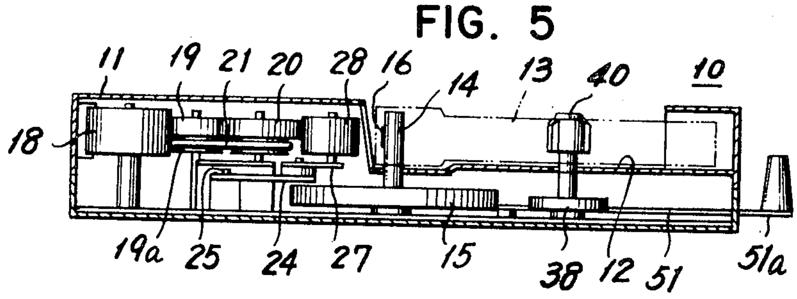
FIG. 5 is a sectional view of the cassette adapter taken along line V—V in FIG. 4.

With reference to FIGS. 1 and 5, therein is seen a cassette adapter 10 which has a casing 11 which is substantially of the same shape as a tape cartridge. The casing 11 is formed with a recess 12 in the upper surface for receiving a tape cassette 13. At a predetermined position in the cassette receiving recess 12, a shown in FIG. 5, there is a capstan shaft 14 projecting upwardly. When the cassette 13 is mounted on the adapter, the capstan shaft 14 enters the cassette 13 through an aperture formed in the cassette case, and is positioned inside a magnetic tape 16. The capstan shaft 14 is provided at its lower portion with an integral flywheel 15. When the cassette 13 is mounted on the adapter 10, reel shafts 40 and 41 mounted on reel discs 38 and 39 and projecting upwardly from the recess 12 fit into apertures 42 and 43 of the cassette 13.

Figure 2:
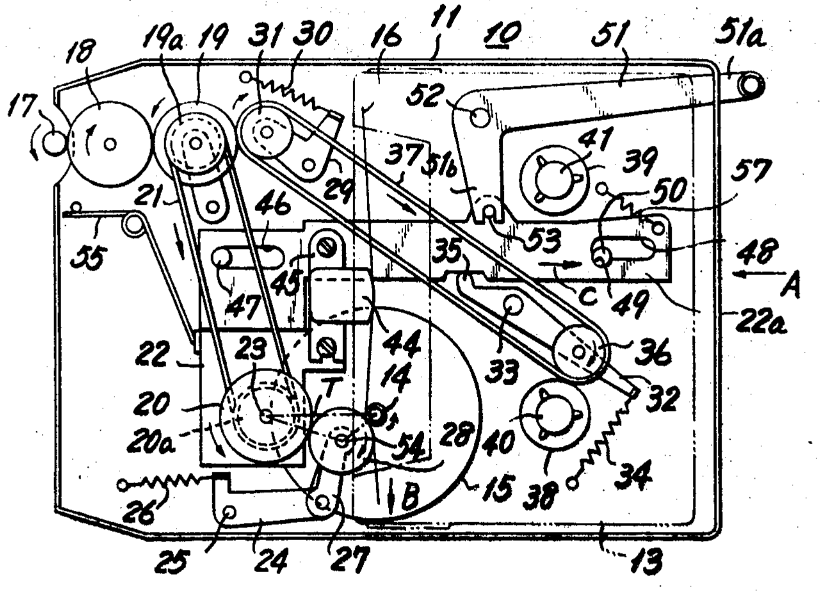
FIG. 2 through FIG. 4 are plan views respectively illustrating the cassette adapter shown in FIG. 1 with its upper plate removed, during driving and running of the cassette tape, at the time when the cassette tape has completed its running, and at the time when the cassette tape has stopped its running.

The cassette adapter 10 having the tape cassette 13 mounted thereon in the aforementioned manner is inserted into a tape driving apparatus designed for playing a tape cartridge. The adapter 10 is inserted in the direction of arrow A as shown in FIG. 2, to a predetermined tape cartridge loading position in the tape driving apparatus. When the cassette adapter 10 is loaded at this predetermined position, a pinch roller 18 provided in the casing 11 of the cassette adapter 10 is brought into pressing contact with a capstan shaft 18 provided in the tape driving apparatus.

An idler 19 is pressed against the pinch roller 18. A belt 21 is wound around a pulley 19*a* provided above the idler 19 and around a pulley 20*a* provided under a pinch roller driving idler 20. The idler 20 is rotatably mounted on a sliding plate 22 by a shaft 23. A lever 24 is pivotally mounted on a shaft 25. A spring 26 which is stretched between one end of the lever 24 and the casing 11 urges the lever 24 in a counterclockwise direction. An arm 27 is pivotally supported at the other end of the lever 24. A driving pinch roller 28 is rotatably mounted at the other end of the arm 27 by a shaft 54. The driving pinch roller 28 is always urged into pressing contact with the idler 20 and the capstan shaft 14 by the force of the spring 26.

A lever 29 is connected at one end to a spring 30 stretched between the lever 29 and the casing 11 and at the other end a pulley 31 is rotatably mounted thereon. A lever 32 is pivotally supported on a shaft 33 and a spring 34 is stretched between one end of the lever 32 and the casing 11. The lever 32 is formed at the other end with a circular projection 35. A pulley 36 is rotatably mounted on the lever 32. A belt 37 is wound around the pulleys 31 and 36. The pulley 31 is always pressed against the idler 19 through the belt 37 by the force of the spring 30. the pulley 36 is pressed against a reel disc 38 through the belt 37 by the force of the spring 34.

A magnetic head 44 which makes contact with the tape 16 is mounted on a head holder 45 fixed to the sliding plate 22. The sliding plate 22 is substantially of the L-shape in the plan view, and is formed with a slot 46 in the base portion of its long arm 22a. A pin 47 fixed to the casing 11 is engaged in the slot 46. In the fore end portion of the long arm 22a, there is formed a slot 48 having a recess 49. A pin 50 fixed to the casing 11 is engaged in the slot 48, and in the state as shown in FIG. 2, the pin 50 is engaged in the recess 49 thereby locking the sliding plate 22 at the position shown in the figure.

A spring 57 is stretched between the foremost end portion of the long arm 22a of the sliding plate 22 and the casing 11. A lever 51 is pivotally supported on a shaft 52. An operation part 51a of one end portion of the lever 51 projects from the casing 11, and the other end portion 51b is engaged with a pin 53 provided at the middle portion of the long arm 22a of the sliding plate 22. The sliding plate 22 is subjected to a sliding force from a spring 55 in the direction of arrow C.

After the cassette 13 is mounted on the cassette adapter 10, the lever operating part 51a is pivotally moved in a counterclockwise direction before or after the cassette adapter 10 is loaded in the tape driving apparatus. This causes the driving pinch roller 28 and the magnetic head 44 to enter the case of the cassette 13, as shown in FIG. 2, thereby bringing the driving pinch roller 28 into pressing contact with the capstan shaft 14 through the tape 16 and bringing the magnetic head 44 into contact with the tape 16. The belt 37 provided around the pulley 36 is also pressed against the reel disc 38.

In the state shown in FIG. 2, the tape driving apparatus is in a play mode. The tape driving apparatus may also be changed to a play mode automatically at the same time as the insertion of the cassette adapter 10 into the apparatus. The capstan 17 is driven by a motor in rotation in a counterclockwise direction in the figure. The rotation of the capstan 17 is transmitted through the pinch roller 18, idler 19, pulley 19a, belt 21, pulley 20a and idler 20 to the driving pinch roller 28 pressed against the idler 20, whereby the driving pinch roller 28 is rotated in a clockwise direction.

Since the driving pinch roller 28 is pressed against the capstan shaft 14 through the tape 16, the capstan shaft 14 and the flywheel 15 receive a rotational drive force from the driving pinch roller 28, and are thereby rotated. By the rotation of the pinch roller 28 and the capstan shaft 14, the tape 16 held therebetween is driven and advances at a predetermined speed in the direction of arrow B.

The driving pinch roller 28 is pressed against the idler 20 and the capstan shaft 14 in a relative position as shown in the figure. Namely, the axes of the shaft 23 of the idler 20, the capstan shaft 14 and the shaft 54 of the driving pinch roller 28 are positioned in such a manner that they form a triangle T with the axis of the shaft 54 as its apex. The shaft 54 is positioned on the side of advancement of the tape 16 with respect to the base of the triangle formed between the shafts 23 and 14 (i.e. the side on which the tape 16 is taken up).

Some minute irregularity in rotation which may occur in the course of transmission of rotation between the capstan 17 and the pulley 19a is absorbed by the belt 21. Since the flywheel 15 has a large moment of inertia, the flywheel 15 and the capstan shaft 14 rotate smoothly. This smooth rotation of the flywheel 15 and the capstan shaft 14 has a controlling effect to make rotation of the pinch roller 28 which drives the capstan shaft 14 and the idler 20 smooth. As a combined effect of the foregoing, the tape 16 is always driven and run in a stable manner at a predetermined speed.

The rotational velocity of the driving pinch roller 28 is determined in conjunction with its diameter so that the peripheral velocity of the driving pinch roller 28 becomes identical with the predetermined running speed of the tape. Since the diameter of the driving pinch roller 28 is made several times larger than that of the capstan shaft 14, the rotational velocity of the driving pinch roller 28 can be a small fractional portion of the rotational velocity of the capstan 14 which is necessary for causing the tape 16 to run at the predetermined velocity. Furthermore, the driving pinch roller 28 is positioned on the side of driving rotation with respect to the capstan shaft 14, and performs the function of a capstan in a conventional tape recorder in driving the tape 16. In contrast, the capstan shaft 14 is positioned on the side of driven rotation and performs the function of a pinch roller in a conventional tape recorder.

The capstan shaft 14 and the flywheel 15 receive the rotational force directly from the driving pinch roller 28 which is pressed against the capstan shaft 14 without employing any pulleys and belt. This contributes to reducing the total height of the capstan shaft 14 and the flywheel 15, whereby the thickness of the cassette adapter 10 is made relatively thin.

On the other hand, the rotation of the capstan 17 is transmitted through the pinch roller 18, idler 19, pulleys 31 and 36 and belt 37 to the reel disc 38 to rotate the reel disc 38 and the reel shaft 40 in a counterclockwise direction. The reel of the cassette 13 fitted on the reel shaft 40 is rotated in counterclockwise direction takes up the tape 16 driven and by the driving pinch roller 28 and the capstan shaft 14.

When the tape 16 driven and run by the pinch roller 28 and the capstan shaft 14 in the direction of arrow B to effect recording or reproduction has all been fed out of the reel of the cassette 13 mounted on the reel shaft 41 and recording or reproduction has been completed, the subsequent operation will now be described.

The finishing end of the tape 16 is held by the reel fitted on the reel shaft 41 and, accordingly, the tape 16 stops running when all of the tape has been fed out of the reel notwithstanding the continued rotation of the driving pinch roller 28. After the tape 16 has stopped running, the driving pinch roller 28 is still receiving the rotational force from the idler 20 and is being rotated in the clockwise direction in pressing contact with the tape 16. While the tape 16 is running, friction between the driving pinch roller 28 and the tape 16 is small, and the driving pinch roller 28 is at the position shown in FIG. 2. When, however, the tape 16 has stopped running, the friction between the driving pinch roller 28 which is still rotating and the tape 16 which has stopped running becomes great and the driving pinch roller 28 (rotating in the clockwise direction) moves along the tape 16 which is at a standstill in a direction opposite to the arrow B. Thus, the driving pinch roller 28 forces its way between the idler 20 and the capstan shaft 14 from the state shown in FIG. 2 to the state shown in FIG. 3. The driving pinch roller 28 is shifted to the position shown in FIG. 3 against the force of the spring 26, whereby the axes of the shafts 23, 54 and 14 lie substantially on a straight line.

Figure 3:
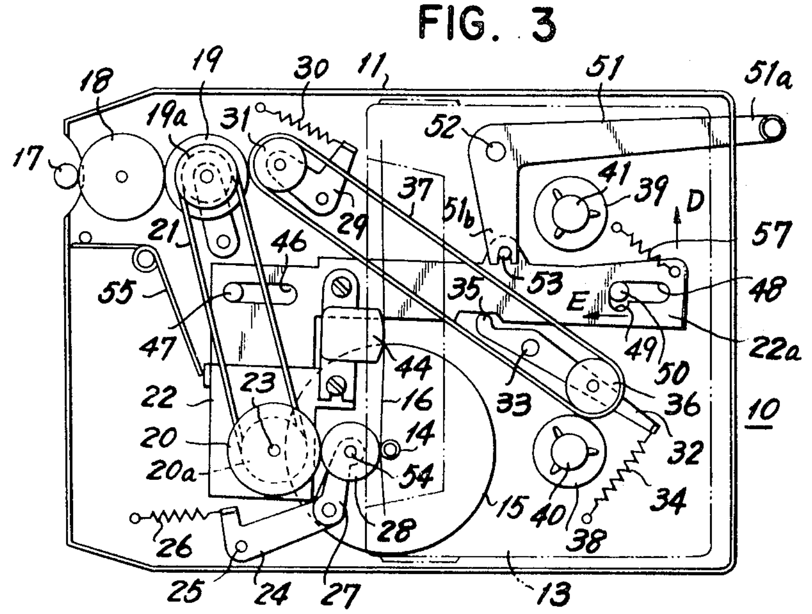

At this time, the capstan shaft 14 remains in its position and, accordingly, the idler 20 is pushed by the driving pinch roller 28 which forces its way between the idler 20 and the capstan shaft 14, whereby the sliding plate 22 is slightly rotated about the pin 47 in a clockwise direction as shown in FIG. 3. This slight clockwise rotating movement of the sliding plate 22 causes the slot 48 to move in a pivotal motion in a clockwise direction. As a result, the pin 50 is disengaged from the recess 49 of the slot 48.

The sliding plate 22 receives forces in the directions of arrows D and E which forces are components of the tension of the spring 57. The force of the driving pinch roller 28 to enter between the idler 20 and the capstan shaft 14 at the time when the tape 16 has stopped running is stronger than the component of the spring 57 in the direction of arrow D, and hence the driving pinch roller 28 moves the sliding plate 22 slightly in a pivotal movement in the clockwise direction, overcoming this component in the direction of arrow D. The sliding plate 22 also receives a sliding force in the direction of arrow E by the component in this direction of the spring 57. In the state shown in FIG. 2, however, the sliding plate 22 is restrained in its movement by the pin 50 which is engaged in the recess 49.

Figure 4:
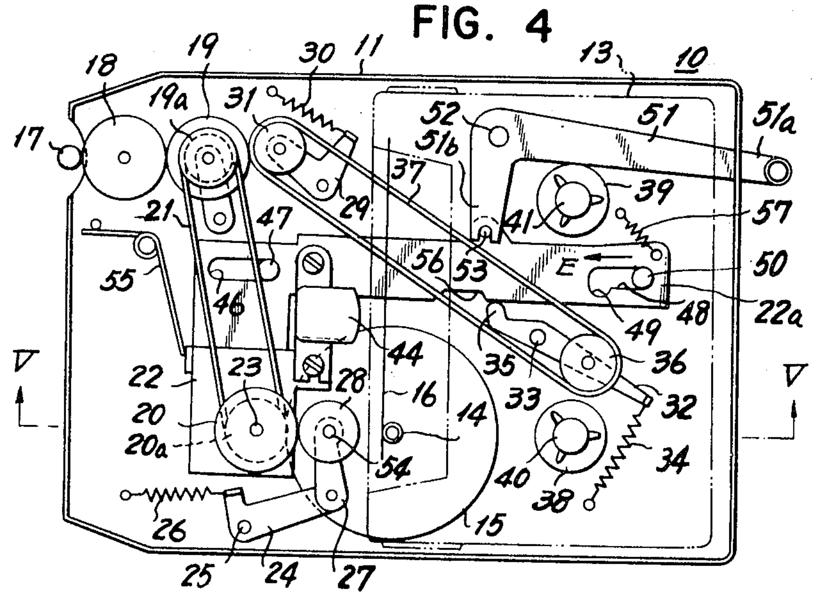

When the pin 50 has been disengaged from the recess 49 as described above, the sliding plate 22 slides in the direction of arrow E by the component of the spring 57 against the force of the spring 55 and shifts to the position shown in FIG. 4. The travel of the sliding plate 22 in the direction of arrow E is guided by the pins 47 and 50 which are fitted in the slots 46 and 48.

Since the driving pinch roller 28 receives a rotating force in a counterclockwise direction with respect to the shaft 25 from the spring 26, when the idler 20 moves with the sliding plate 22 in the direction of arrow E, the driving pinch roller 28, while maintaining its contact with the idler 20, moves away and out the capstan shaft 14 and the tape 16 andout of the casing of the cassette 13. By sliding of the sliding plate 22 in the direction of arrow E, the magnetic head 44 moves integrally with the sliding plate 22 and moves away from the tape 16 and out of the casing of the cassette 13.

As the sliding plate 22 slides in the direction of arrow E, a stepped portion 56 of a recess formed in the middle of the long arm **22*a* of the sliding plate 22 is brought into contact with the projection 35 of the lever 32 and pushes it, thereby pivotably moving the lever 32 in a counterclockwise direction. The counterclockwise pivotal movement of the lever 32 causes the belt 37 provided around the pulley 36 to move away from the reel disc 38. Consequently, the transmission of the rotational force to the reel disc 38 is interrupted, and the reel disc 38 stops its rotation. Accordingly, the reel which is fitted on the reel shaft 40** stops winding the tape.

The sliding movement of the sliding plate 22 in the direction of arrow E causes the end **51*b* of lever 51 which is engaged with the pin 53 to pivotably move in a clockwise direction thereby also pivotably moving the operating part 51*a*** in a clockwise direction.

Thus, the driving pinch roller 28 and the magnetic head 44 have moved away from the tape 16 and out of the casing of the cassette 13. The transmission of the rotation to the reel disc 38 has been interrupted and the reel has stopped its rotation. Consequently, the mechanism of the cassette adapter 10 is automatically changed to a stop mode simultaneously with the stopping of the tape upon completion of the running of the tape. In this state, the driving pinch roller 28 and the magnetic head 44 are outside of the case of the cassette 13, so that the cassette 13 can be easily removed from the recess 12 in the casing 11 of the cassette adapter 10.

If it is desired to change the cassette 13 to a stop mode during playing of the cassette 13, the operating part **51*a* of the lever 51 is manually rotated in a clockwise direction. The sliding plate 22 thereby receives a strong sliding force in the direction of arrow E by the rotating force of the lever 51. This causes the pin 50 to ride over the semi-circular recess 49, whereby the sliding plate 22 is slightly rotated in a clockwise direction to shift to the position shown in FIG. 3. Then, each component part is displaced to the position shown in FIG. 4 in the above described manner, and the cassette adapter 10** is changed to a stop mode.

Loading of another cassette 13 in the recess 12 of the cassette adapter 10 is conducted in the state shown in FIG. 4, namely the state in which the operating part 51a of the lever 51 has been rotated in the clockwise direction. After the cassette 13 is loaded in the recess 12, the operating part 51a is rotated in a counterclockwise direction. The sliding plate 22 slides in the direction of arrow C as shown in FIG. 2, and the pinch roller 28 again assumes its position shown in FIG. 2 relative to the idler 20 and the capstan shaft 14. Thus, each component part of the cassette adapter 10 is shifted to the position shown in FIG. 2.

While the invention has been described with respect to a specific and preferable embodiment, various modifications and variations thereof will be apparent to those skilled in the art without departing from the scope of the invention as is set forth in the appended claims.

I claim:

1. A cassette adapter for enabling playing a cassette in a cartridge player having a capstan for driving the tape of a cartridge inserted into the player, said cassette adapter comprising: a casing having the shape of a cartridge and including a receiving portion for receiving and holding a tape cassette therein; a first pinch roller mounted within said casing for being directly pressed against the capstan of the cartridge player for transmitting drive rotation from the capstan when the casing is inserted into the cartridge player; a shaft secured in said casing in a position to enter into a cassette and be positioned inside of a magnetic tape in the cassette when the cassette is received in said receiving portion; a second pinch roller having a diameter larger than the diameter of said shaft, said second pinch roller being mounted in said casing for being urged into contact with said shaft, with the tape interposed therebetween, for rotating said shaft and for advancing said tape; means for transmitting the rotation of said first pinch roller to said second pinch roller including an idler for contacting said second pinch roller; means displacably supporting said second pinch roller from said casing and urging the second pinch roller into pressing contact with said idler; a magnetic head for contacting the magnetic tape in the cassette; a sliding plate mounted in said casing and carrying said idler and said magnetic head, said sliding plate being slidable in a direction substantially perpendicular to the advancing direction of the tape; means for urging said sliding plate in a direction to move said idler away from said shaft; and locking means for releasably locking said sliding plate against the action of the force applied by said urging means in a position in which the axes of said idler, the second pinch roller and the shaft are disposed respectively at the apexes of a hypothetical triangle whereby said capstan can be driven in rotation from the idler through the second pinch roller; said second pinch roller entering, when the advance of the tape has been stopped at the end of the tape, into a space between said idler and said shaft due to increase of friction between said second pinch roller which is rotating and said tape which is at a standstill, thereby pushing said idler in a direction to move said idler away from said shaft and displace said sliding plate, said locking means being released by displacement of the sliding plate whereupon said sliding plate is displaced by said urging means in a direction to move said idler further away from said shaft, said second pinch roller moving away from said shaft with said idler thereby stopping the driving of the tape.

2. The cassette adapter as claimed in claim 1 wherein said sliding plate is moved to a position by the urging means at which said magnetic head and said second pinch roller are retracted from said cassette.

3. The cassette adapter as claimed in claim 1 further comprising a reel shaft which enters said cassette when said cassette is received in said receiving portion, a reel disc carrying said reel shaft, movable drive means for transmitting the rotation of said first pinch roller to said reel disc by pressing contact with said reel disc, and means for engaging said sliding plate and moving said movable drive means away from said reel disc upon sliding movement of said sliding plate.

4. The cassette adapter as claimed in claim 1 further comprising a flywheel integrally mounted on said shaft at the lower end thereof, said means which transmits the rotation from the first pinch roller to the second pinch roller including a first pulley rotated by said first pinch roller, a second pulley transmitting the rotation to said second pinch roller, and a belt coupled to said pulleys.

5. The cassette adapter as claimed in claim 1 further comprising an operating lever pivotably mounted in said casing and including a portion extending therefrom, said operating lever being coupled to said sliding plate to release the locking means and displace the plate to interrupt drive of the magnetic tape at any point along the length thereof.

6. The cassette adapter as claimed in claim 5 wherein the operating lever is so coupled to the sliding plate to follow the movement thereof when the plate is displaced at the end of travel of the tape, said sliding plate then being returned to its initial position in which it is ready for playing of a new tape by pivotably displacing the extending portion of the operating lever.

* * * * *